(12) United States Patent
Kato et al.

(10) Patent No.: US 6,262,862 B1
(45) Date of Patent: Jul. 17, 2001

(54) HAND CLOSING MECHANISM FOR LIBRARY APPARATUS

(75) Inventors: Chikatsu Kato; Hiroshi Shibuya; Nobuhiko Motoyama; Daisuke Hori, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/032,932

(22) Filed: Mar. 2, 1998

(30) Foreign Application Priority Data

Sep. 19, 1997 (JP) .................................................... 9-254830

(51) Int. Cl.$^7$ ............................ G11B 15/68; G11B 17/02; B25J 15/08
(52) U.S. Cl. ........................ 360/92; 360/98.06; 369/178; 901/31; 414/741
(58) Field of Search .................................. 360/92, 98.04, 360/98.05, 98.06; 369/34, 36, 37, 38, 39, 178; 901/30, 31, 36, 37, 38, 39; 414/729, 741

(56) References Cited

U.S. PATENT DOCUMENTS 4,900,078 * 2/1990 Bloch ...................................... 901/36

FOREIGN PATENT DOCUMENTS 61-274893  12/1986 (JP) .
63-62685    3/1988 (JP) .

* cited by examiner

Primary Examiner—Craig A. Renner
(74) Attorney, Agent, or Firm—Greer, Burns & Crain Ltd.

(57) ABSTRACT

A cartridge transferring robot for use in a library apparatus includes a pair of upper and lower hand members made to vertically come into contact with a cartridge to grip the cartridge, a pair of left and right direct-acting beatings for fitting the hand members to a hand base so that they are vertically slidable, and an opening and closing mechanism for making the hand members take opening and closing actions. The hand members are independently guided by the direct-acting bearings, and the fitting portions of the hand members to the direct-acting bearings are made not to interfere with each other in a state where the hand members are in a closed condition. This invention is applicable to a library apparatus storing a large number of cartridges such as magnetic tape cartridges and optical disk cartridges.

2 Claims, 6 Drawing Sheets

HAND CLOSING MECHANISM FOR LIBRARY APPARATUS

BACKGROUND OF THE INVENTION

1) Field of the Invention

The present invention relates to a cartridge transferring robot for use in a library apparatus which stores a large number of cartridges such as magnetic tape cartridges and optical disk cartridges, with the cartridge transferring robot conveying of the cartridges among a storage rack, a cartridge entry/exit station and a deck unit within the library apparatus, and further relates to a library apparatus including that cartridge transferring robot.

2) Description of the Related Art

In general, a library apparatus functions as a large-capacity external storage memory, and a storage rack in its locker stores several thousands of cartridges each accommodating, for example, a magnetic tape as a storage medium, and access such as write/read of recording/recorded data is automatically done in relation to the storage medium within each of the cartridges.

Furthermore, in addition to the aforesaid storage rack (storage unit) for storing the cartridges, the library apparatus is equipped with a station [for example, a CAS (Cartridge Access Station), a DEE (Direct Entry/Exit), and an FES (Forced Exit Station)] for carrying out the entry of the cartridges from the external into the apparatus or vice versa, a plurality of magnetic tape decks (which will be referred to hereinafter as decks) for conducting access such as write/read of recording/recorded data with respect to a storage medium (magnetic tape) within a cartridge, and a cartridge transferring robot [automatic transferring robot; which will be referred hereinafter to as an accessor (ACC)] for performing the conveyance of the cartridges among the storage rack, the cartridge entry/exit station and the decks.

In the case of such a library apparatus, on receiving an access demand to one cartridge from a host unit or the like, the accessor moves to the storage rack to search the directing cartridge and then transfers that cartridge up to the deck in a state of gripping or holding it through the use of a hand mechanism, thereby putting it into that deck. Whereupon, the deck processes the storage medium (magnetic tape) within the cartridge. The cartridge discharged from the deck after the completion of the processing is regripped by the hand mechanism of the accessor and transferred up to the storage rack by that accessor to be stored in a given location.

Figure 7:
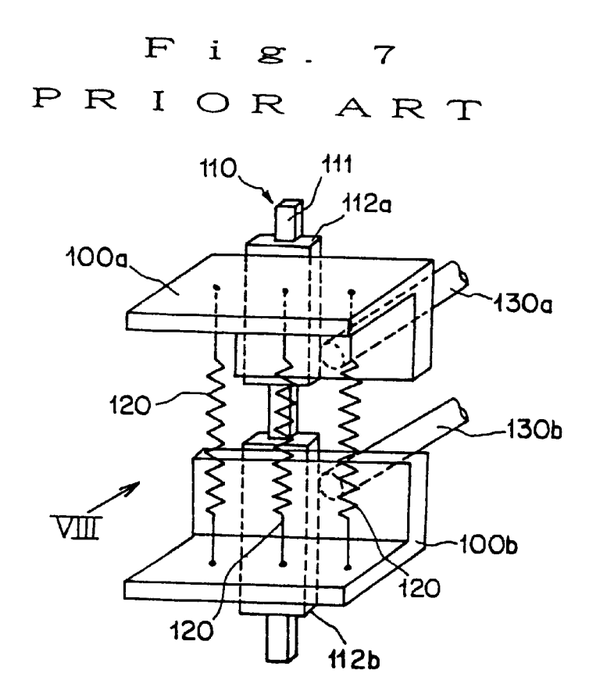
FIG. 7 is a perspective view illustratively showing a principal portion of a hand mechanism of a prior accessor.
Figure 8:
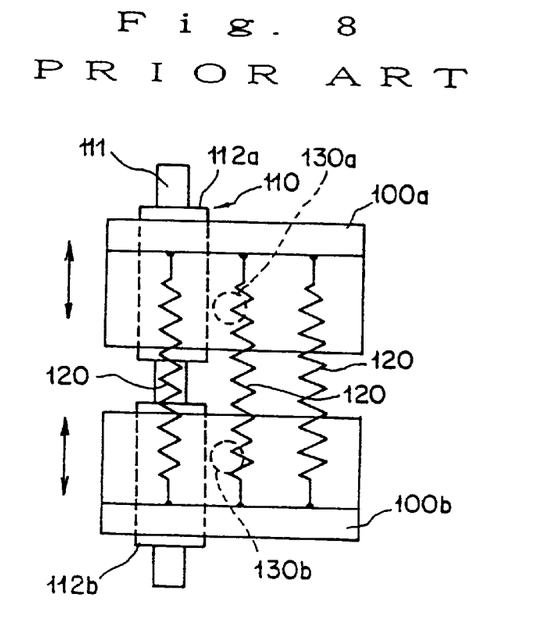
FIG. 8 is an illustration of a portion indicated by an arrow VIII in FIG. 7.

In the prior art, the hand mechanism of the accessor is constructed, for example, as shown in FIGS. 7 and 8. That is, the hand mechanism has a pair of upper and lower hand members 100a, 100b for gripping a cartridge (not shown) by coming into contact with the cartridge from the above and below, and these hand members 100a, 100b are attached through a direct-acting (or direct-operated) bearing (LM guide) 110 to a hand base (not shown) to be slidable up and down. Between the hand members 100a, 100b there are interposed a plurality of (3 in FIG. 7) springs 120 whereby the hand members 100a, 100b are biased in closing directions of gripping a cartridge.

The direct-acting bearing 110 is composed of one guide rail 111 fitted to the hand base side and two blocks (bearings) 112a, 112b guided along the guide rail 111 to be slidable up and down, with the hand members 100a, 100b being attached to these blocks 112a, 112b, respectively.

Furthermore, rods 130a, 130b are protrusively installed on rear end surfaces of the hand members 100a, 100b, respectively. The hand members 100a, 100b are respectively connected through the rods 130a, 130b to an opening and closing mechanism (not shown) so that the hand members 100a, 100b are vertically driven against the biasing forces of the springs 120 to take the opening and closing action.

In the case of this hand mechanism, its thickness depends upon the length of the guide rail 111 constituting the direct-acting bearing 110. As shown in FIG. 7 or 8, in the structure including only one direct-acting bearing 110, the respective blocks 112a, 112b increase in size because of the loads on the blocks 112a, 112b, with the result that the guide rail 111 becomes longer, that is, the hand mechanism has a larger thickness.

Figure 9:
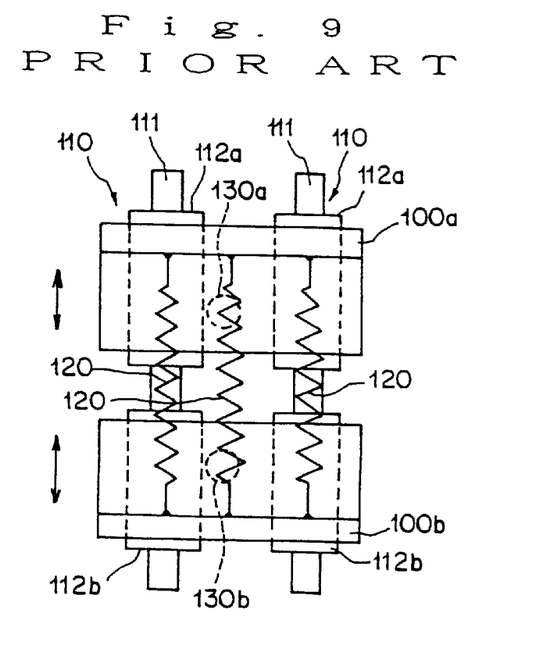
FIG. 9 is a front elevational view showing a principal portion of another hand mechanism of a prior accessor.

For this reason, a prior hand mechanism shown in FIG. 9 has been proposed. In FIG. 9, the hand mechanism uses two direct-acting bearings 110, so that the size reduction of the blocks 112a, 112b to be respectively guided along the direct-acting bearings 110, 110 is achievable, which contributes to shorter lengths of the guide rails 111. Though, when the two direct-acting bearings 110, 110 are used in parallel to each other, the fitting surfaces of the two guide rails 111 are required to have extremely high parallelism and flatness, and if not, the sliding resistance of the respective blocks 112a, 112b sliding along the guide rails 111 increase.

On the other hand, in the prior accessor hand mechanism, as shown in FIGS. 7 to 9, the surfaces (gripping portions) of the hand members 100a, 100b coming into contact with a cartridge to grip that cartridge are large in area, and therefore, there is no need for a particularly strong gripping force being applied through the hand members 100a, 100b to a cartridge. Whereas, in connection with the tendency toward the reduction of the hand mechanism of the accessor in size and weight, the areas of the aforesaid gripping portions also reduce. Accordingly, at the conveyance or insertion/extraction of a cartridge, it is necessary to apply a strong gripping force to a cartridge in order to certainly grip the cartridge by the hand mechanism.

For such a strong gripping force, consideration can be paid to ways to increase the number of springs 120 to be put between the hand members 100a, 100b and to select springs 120 having stronger forces. However, in the case of increasing the number of springs 120, there is a need for a further space accepting the increased springs 120, which makes the size reduction of the hand mechanism difficult.

Furthermore, even if employing stronger springs, the opening degree between the hand members 100a, 100b decreases with respect to the thickness of the hand mechanism, with the result that not only difficulty is encountered in that the springs themselves assume a long free length but also a restriction occurs in that the springs are required to exhibit a stronger force with less distortion, which adversely affects the degree of freedom on the spring design, and which makes difficult the appropriate design depending on the dimensional conditions.

In conjunction with the recent increase in the volume of information in computer systems, as a means to retain information in a state of freely making the recording/reproduction without the need for an operator, the library apparatus fully automatized as mentioned above appears, which allows storing a large number of cartridges. On the other hand, for the future, it is desired to store a larger number of cartridges in a limited installation space. In order to enhance the cartridge storing efficiency, it is indispensable to dispose cells in a storage rack with a higher density.

For the insertion/extraction of cartridges into/from such cells disposed with a high density, it is essential to enlarge the operating range of a hand mechanism of an accessor, and further to accomplish the reduction of the hand mechanism itself in size, weight and thickness. In addition, it is desired to certainly grip the cartridges irrespective of the size reduction of the hand mechanism.

SUMMARY OF THE INVENTION

The present invention has been developed with a view to eliminating these problems, and it is therefore an object of the present invention to provide a cartridge transferring robot for a library apparatus which is capable of realizing the reduction of a hand mechanism in size and thickness without impairing the operating performance of hand members and further of applying a strong gripping force to the hand members in a small space to certainly grip a cartridge notwithstanding the reduced area of the cartridge gripping portion caused by the size and weight reduction of the hand mechanism, and further to provide a library apparatus having this cartridge transferring robot.

For this purpose, in accordance with the present invention, in a library apparatus including a storage rack for storing cartridges each accommodating a storage medium, a cartridge entry/exit station for the entry/exit of the cartridge, and a deck for carrying out access to the storage medium within the cartridge, a cartridge transferring robot for use in the library apparatus is composed of a picker section including a hand mechanism for gripping the cartridge for insertion and extraction of the cartridge at cartridge conveyance within the library apparatus and a moving mechanism for moving the picker section up to a given position. The hand mechanism has a pair of upper and lower hand members made to vertically come into contact with the cartridge to grip the cartridge, a pair of left and right direct-acting bearings for fitting the pair of upper and lower hand members to a hand base so that the pair of upper and lower hand members are slidable up and down, and an opening and closing mechanism for making the pair of upper and lower hand members driven to take opening and closing actions, wherein the pair of upper and lower hand members are independently guided by the pair of left and right direct-acting bearings, respectively, and the fitting portions of the pair of upper and lower hand members to the pair of left and right direct-acting bearings are formed not to interfere with each other when the pair of upper and lower hand members are in the closed condition.

In addition, in accordance with this invention, a library apparatus comprises a storage rack for storing cartridges each accommodating a storage medium, a cartridge entry/exit station for the entry/exit of the cartridge, a deck for carrying out access to the storage medium within the cartridge, and a cartridge transferring robot including a picker section having a hand mechanism for gripping the cartridge for the insertion/extraction of the cartridge and a moving mechanism for moving the picker section to a given position, to transfer the cartridge among the storage rack, the cartridge entry/exit station and the deck. The hand mechanism of the cartridge transferring robot is composed of a pair of upper and lower hand members driven to vertically come into contact with the cartridge to grip the cartridge, a pair of left and right direct-acting bearings for fitting the pair of upper and lower hand members to a hand base so that the pair of upper and lower hand members are vertically slidable, and an opening and closing mechanism for making the pair of upper and lower hand members take opening and closing actions, with the pair of upper and lower hand members being independently guided by the pair of left and right direct-acting bearings, respectively, and the fitting portions of the pair of upper and lower hand members to the pair of left and right direct-acting bearings are made not to interfere with each other when the pair of upper and lower hand members are in the closed condition.

In the foregoing cartridge transferring robot for a library apparatus and the aforesaid library apparatus, the pair of left and right direct-acting bearings independently guide the pair of upper and lower hand members, with the result that the increase in the sliding resistance is avoidable even if not setting the fitting surfaces of the guide rail constituting each of the direct-acting bearings so that they have high-accuracy parallelism and flatness. In addition, when the pair of upper and lower hand members are in the closed condition, the fitting portions of the pair of upper and lower hand members to the pair of left and right direct-acting bearings do not interfere with each other, and therefore, it is possible to reduce the thickness of the hand mechanism, which contributes to the size reduction and lower manufacturing cost of the library apparatus.

Furthermore, in accordance with this invention, a cartridge transferring robot for a library apparatus which is the same as that mentioned above is equipped with a picker section having a hand mechanism for gripping a cartridge for the insertion/extraction of the cartridge and for transferring the cartridge within the library apparatus and further equipped with a moving mechanism for moving the picker section to a given position. The hand mechanism includes a pair of upper and lower hand members driven to vertically come into contact with the cartridge to grip the cartridge, a hand base to which the pair of upper and lower hand members are fitted to be vertically slidable, a biasing mechanism for biasing the pair of upper and lower hand members in closing directions of gripping the cartridge, and an opening and closing mechanism for making the pair of upper and lower hand members take opening and closing actions. The biasing mechanism are composed of a first spring interposed between the upper hand member and the hand base for downwardly biasing the upper hand member, and a second spring placed between the lower hand member and the hand base for upwardly biasing the lower hand member, with the first and second springs being located to horizontally extend backwardly with respect to the pair of upper and lower hand members.

Still further, in accordance with this invention, a library apparatus contains a cartridge transferring robot has a hand mechanism which includes a pair of upper and lower hand members driven to vertically come into contact with the cartridge to grip the cartridge, a hand base to which the pair of upper and lower hand members are fitted to be vertically slidable, a biasing mechanism for biasing the pair of upper and lower hand members in closing directions of gripping the cartridge, and an opening and closing mechanism for making the pair of upper and lower hand members take opening and closing actions. The biasing mechanism is composed of a first spring interposed between the upper hand member and the hand base for downwardly biasing the upper hand member, and a second spring placed between the lower hand member and the hand base for upwardly biasing the lower hand member, with the first and second springs being located to horizontally extend backwardly with respect to the pair of upper and lower hand members.

In the foregoing cartridge transferring robot for a library apparatus and the aforesaid library apparatus, the first and second springs constituting the biasing mechanism are disposed in a surplus space on the rear side (the exterior of the space between the hand members) with respect to the hand members, and hence, a strong gripping force can work on the hand members even in a small space, which ensures the certain gripping of the cartridge notwithstanding smaller areas of the gripping portions for the cartridge. Accordingly, it is possible to easily accomplish the size and thickness reduction of the hand mechanism with a strong gripping force, thus contributing to the size reduction and lower manufacturing cost of the library apparatus.

DESCRIPTION OF THE PREFERRED EMBODIMENTS

Embodiments of the present invention will be described hereinbelow with reference to the drawings.

[1] Description of Entire Arrangement of Library Apparatus

Figure 2:
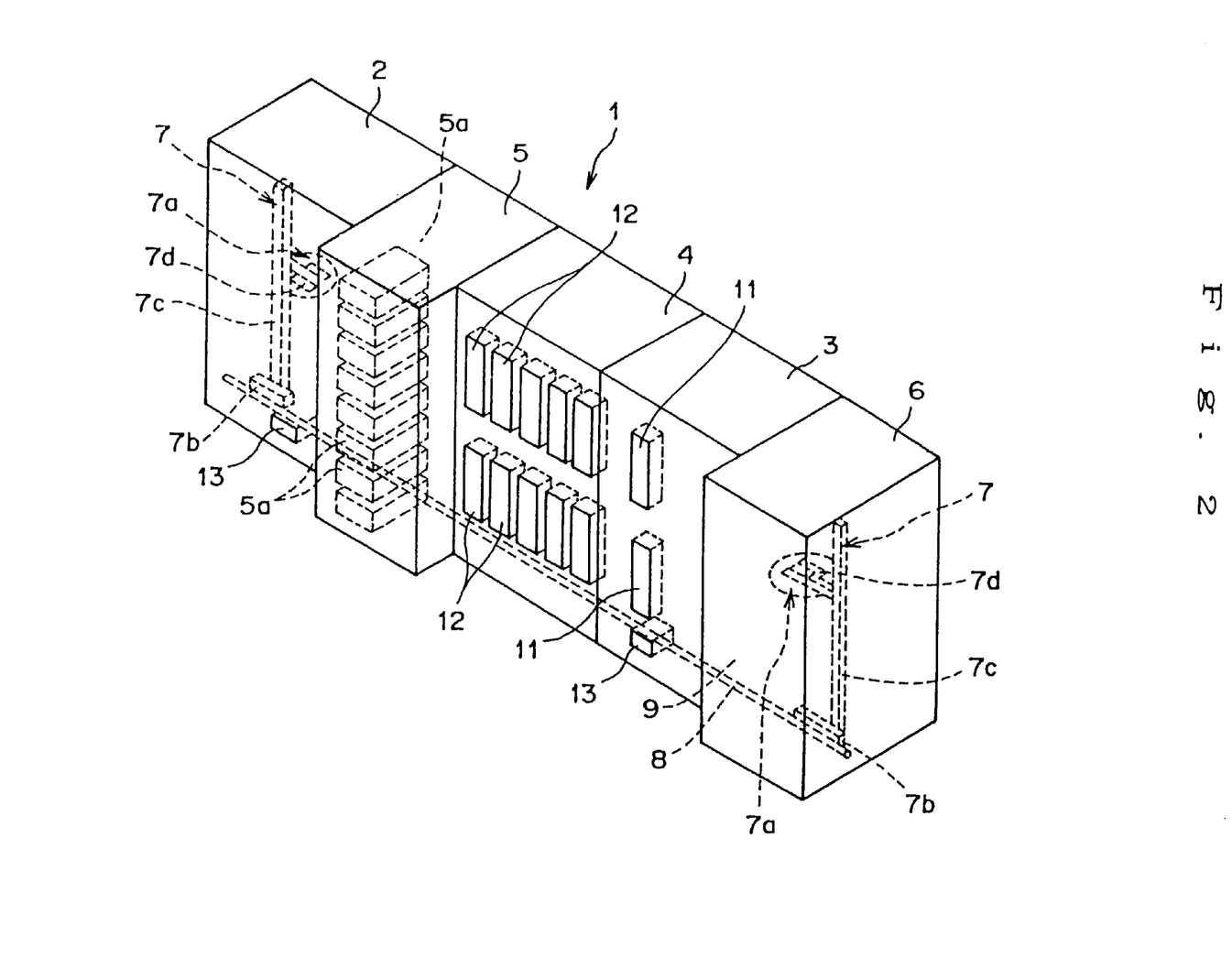
FIG. 2 is a perspective view illustratively showing the whole structure of a library apparatus to which embodiments of this invention are applicable.

FIG. 2 is a perspective view illustratively showing the entire construction of a library apparatus to which embodiments of this invention are applicable. As shown in FIG. 2, a library apparatus 1 to which embodiments of this invention are applicable stores a large number of magnetic tape cartridges (not shown; cartridges each accommodating a magnetic tape as a storage medium) and conducts access such as write/read of recording/recorded data in relation to each of the magnetic tape cartridges.

The library apparatus 1 is composed of, for example, left and right accessor units (which will be referred hereinafter to as LAU, RAU, respectively) 2, 3, a cartridge storage unit (which will be referred hereinafter to as a CSU)4, a tape drive mount unit (which will be referred hereinafter to as a TMU) 5, and an accessor extend unit (which will be referred hereinafter to as an AEU) 6, which are in a connected relation to each other. Also included in the apparatus 1 are cartridge transferring robots (automatic conveying robot; which will be referred hereinafter to as accessors) 7 which are located on the left and right sides, respectively, and which move within these units 2 to 6 to transfer the cartridge.

The LAU 2 and RAU 3 function as garages for the accessors 7, respectively, and on the front side of the RAU 3 (the external space side, that is, the side where the operator operates the apparatus) there are provided a pair of upper and lower cartridge entry/exit stations [each of which will be referred hereinafter to as a CAS (Cartridge Access Station)] 11, 11 for carrying out the entry or exit of the cartridge into or from the library apparatus 1 and a cartridge forced exit station (FES) 13 for forcedly discharging a defective cartridge to the external. In addition, another FES 13 is placed on the front side of LAU 2.

The CSU4 stores a large number of cartridges, and in the embodiments of this invention, five cartridge direct entry/exit stations (each of which will be referred hereinafter to as a DEE) 12 are set on the upper side and five DEEs 12 on the lower side, ten in total. In each of the DEEs 12, a magazine (not shown) storing a plurality of cartridges is set in order to permit the simultaneous entry or exit of the plurality of cartridges into or from the library apparatus 1.

Furthermore, a storage rack (not shown) having a large number of cells for storing a large number of cartridges is placed on an inner wall surface of each of the LAU 2, RAU 3 and CSU4, and the cartridge from the CAS 11 or the DEE 12 is stored in a given cell of the storage rack through the use of the accessor 7.

The TMU 5 has a plurality of (8 in FIG. 2) magnetic tape decks (which will be referred hereinafter to as decks) 5a, and each of the decks 5a conducts the write/read processing of recording/recorded data onto/from a magnetic tape within the cartridge transferred by each of the accessors 7.

The AEU 6 includes a power source (not shown) for supply of an operating power to each of the accessors 7 and a controller (not shown) for control of the accessors 7.

These units 2 to 6 are in a coupled relation to each other and are disposed in a state where their rear surfaces (the sides opposite to the above-mentioned front side) are brought into contact with a wall surface or the like, and organize the library apparatus 1. Further, formed in the library apparatus 1 is an operating space (accessor passage) 9 for the accessors 7 which penetrates the units 2 to 6, and placed on the bottom surface of this operating space 9 is a rail (X rail) 8 for guiding the respective accessors 7, which allows each of the accessors 7 to move within the operating space 9.

In addition to a hand mechanism 7d for holding the cartridge to perform the insertion/extraction thereof, each of the accessors 7 involves a carriage 7b movable in the horizontal directions along the X rail 8 for moving a hand assembly 7a including this hand mechanism 7d up to a given position and a vertical column 7c for vertically guiding the hand assembly 7a on the carriage 7b, which constitute a moving mechanism. This invention relates to this accessor 7, and a structure and operation thereof will be described later with reference to FIGS. 1 and 3 to 6.

In the library apparatus 1 thus constructed, the cartridge from the CAS 11 or the DEE 12 is gripped and taken out by the hand mechanism 7d of the accessor 7 and is inserted into and stored in a given cell of the storage rack after being carried through the operating space 9 by the accessor 7.

Furthermore, of a large number of cartridges stored in the respective cells of the storage rack, a cartridge(s) specified by a host unit is gripped and pulled out by the hand mechanism 7d of the accessor 7 and then transferred by the accessor 7 through the operating space 9 to the deck 5a of the TMU 5 to be inserted thereinto.

In the deck 5a, after the recording/reproduction processing on/from the magnetic tape housed in the cartridge, the cartridge staying within the deck 5a is discharged therefrom and gripped and taken out by the hand mechanism 7d of the accessor 7 and subsequently inserted into and stored in a given cell of the storage rack by the accessor 7 after passing through the operating space 9.

Incidentally, for discharging the cartridge(s) stored in the storage rack to the exterior of the library apparatus 1, the cartridge to be discharged is gripped by the hand mechanism 7d of the accessor 7 to be taken out from the storage rack and then transferred through the operating space 9 to the CAS 11 or the DEE 12 by the accessor 7 to be inserted into a given position (cell) of the CAS 11 or the DEE 12.

[2] Description of Entire Arrangement of Accessor

Figure 3:
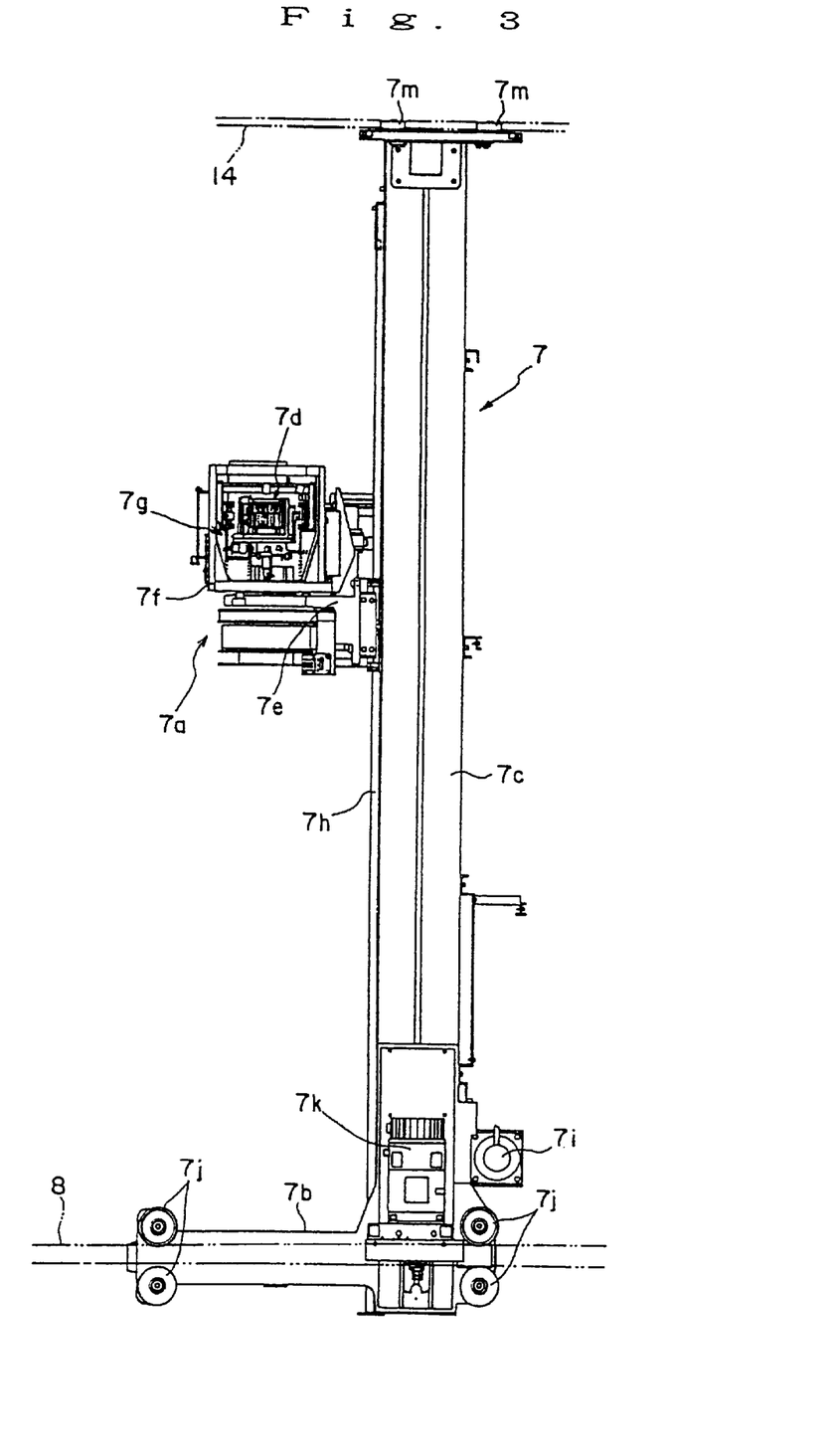
FIG. 3 is a front elevational view showing an accessor in this embodiment of this invention.

FIG. 3 is a front elevational view showing the accessor 7 in the embodiments of this invention. As shown in FIG. 3, the accessor 7 is, as mentioned before, composed of the hand assembly 7a including the hand mechanism 7d, the carriage 7b and the vertical column 7c.

The hand assembly 7a is constructed in such a manner as to place a picker section 7g including the hand mechanism 7d through a tilt base 7f on a supporting base 7e.

The supporting base 7e making up the hand assembly 7a is attached to the vertical column 7c to be allowed to slide up and down while being guided by a guide rail 7h fixed vertically along the vertical column 7c. In addition, the supporting base 7e is coupled to a belt (not shown; a belt wound around a pair of pulleys built in upper and lower locations of the vertical column 7c). When this belt is rotationally driven by an elevating drive motor 7i, the supporting base 7e, that is, the whole hand assembly 7a, is vertically shifted to be positioned at a given height.

The carriage 7b is integrally connected to a lower end side of the vertical column 7c and is made to travel along the X rail 8 while supporting the vertical column 7c. Onto the front and rear sides of this carriage 7b, there are pivotally fitted two sets (two pairs) of traveling rollers 7j, 7j each set of which are situated to vertically sandwich the X rail 8 therebetween to be rotatable in accordance with the traveling of the carriage 7b.

Furthermore, the X rail 8 is equipped with a traveling drive rack (not shown) made to extend in its longitudinal directions. In addition, the carriage 7b is provided with a pinion (not shown) rotationally driven by a traveling drive motor 7k in a state of engaging with that rack.

Still further, a top rail 14 is laid in an upper section of the operating space 9 of the accessor 7 to extend in parallel to the X rail 8. In addition, on the upper end side of the vertical column 7c, there are pivotally fitted two sets (two pairs) of guide rollers 7m, 7m which are situated on the front and rear sides to horizontally sandwich the top rail 14 therebetween to be rotatable in accordance with the traveling of the carriage 7b.

Thus, when the traveling drive motor 7k rotationally drives the pinion, the accessor 7 is wholly moved along the X rail 8 while the pinion and the traveling drive rack gear with each other. Further, when the elevating drive motor 7i revolves the aforesaid belt, the hand assembly 7a is wholly moved up and down along the vertical column 7c. Consequently, the hand assembly 7a (the picker section 7g including the hand mechanism 7d) is shifted up to a given position within a plane including the X rail 8 and the vertical column 7c and positioned thereat.

[3] Description of First Embodiment

A description will be made hereinbelow of an arrangement of a principal portion of a hand mechanism 7d including a feature of a first embodiment of the present invention.

Figure 1:
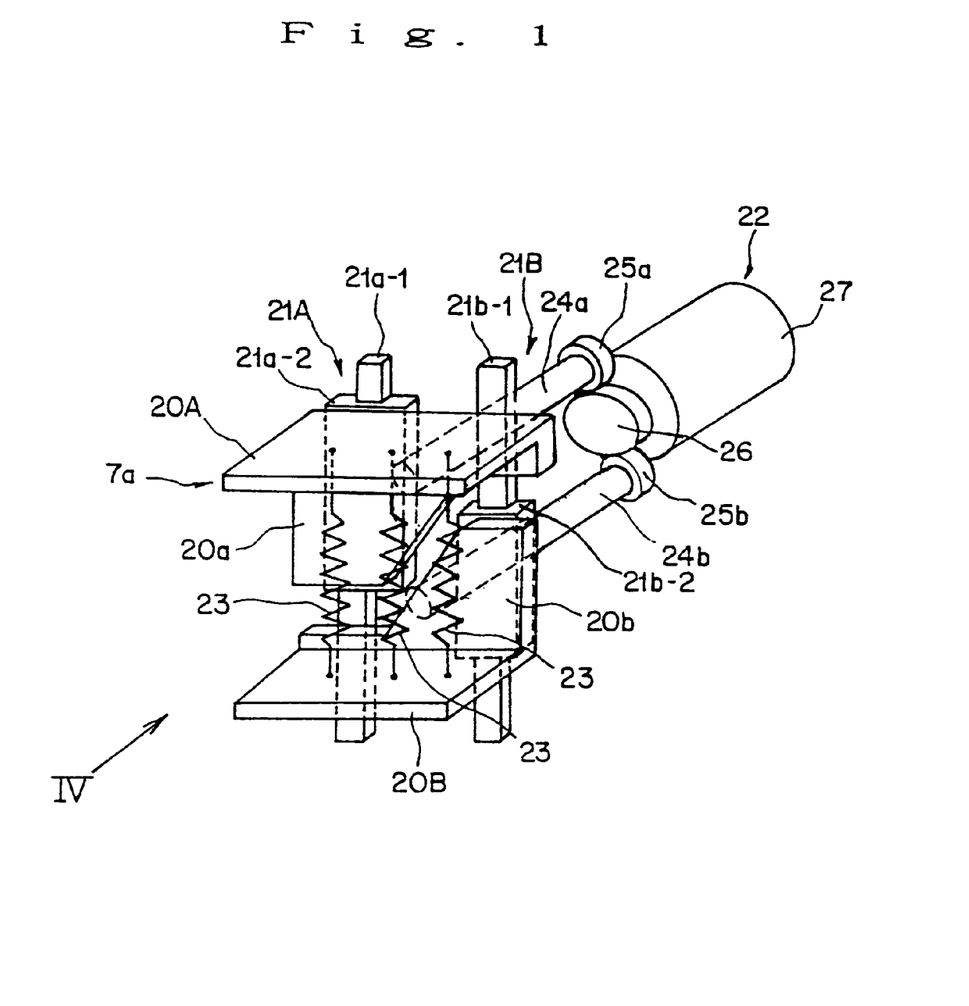
FIG. 1 is a perspective view illustratively showing a principal portion of a hand mechanism of a cartridge transferring robot (accessor) for a library apparatus according to a first embodiment of the present invention.
Figure 4:
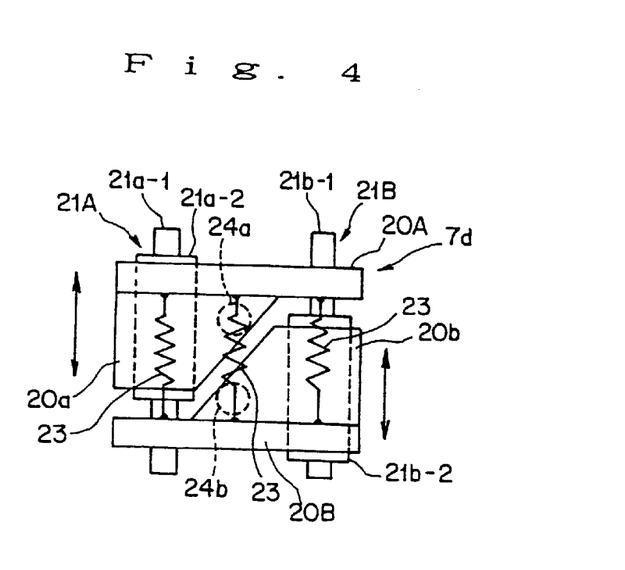
FIG. 4 is an illustration of a portion indicated by an arrow IV in FIG. 1.

FIGS. 1 and 4 show the hand mechanism 7d of a cartridge transferring robot (accessor 7) for a library apparatus according to the first embodiment of this invention. Of these figures, FIG. 1 is a perspective view illustratively showing the principal portion thereof, while FIG. 4 is an illustration of a portion indicated by an arrow IV in FIG. 1.

As shown in FIGS. 1 and 4, the hand mechanism 7d of the accessor 7 according to the first embodiment is composed of a pair of upper and lower hand members 20A, 20B, a pair of left and right direct-acting bearings (LM guide, linear way) 21A, 21B, and an opening and closing mechanism 22.

The pair of upper and lower hand members 20A, 20B are for the purpose of gripping a cartridge (not shown) in a manner of coming into contact with the cartridge from the above and below. Between these hand members 20A, 20B there are placed three springs 23 whereby the hand members 20A, 20B are biased in closing directions of gripping the cartridge.

The pair of left and right direct-acting bearings 21A, 21B are respectively for fitting the pair of upper and lower hand members 20A, 20B to a hand base (not shown; see numeral 31 in FIG. 6) so that the hand members 20A, 20B are slidable up and down, and is made up of guide rails 21a-1, 21b-1 fixedly secured to the hand base side and blocks (bearings) 21a-2, 21b-2 attached to the hand member 20A, 20B sides. The blocks 21a-2, 21b-2 are respectively made to be slidable vertically while being guided by the guide rails 21a-1, 21b-1.

The opening and closing mechanism 22 is for driving the hand members 20A, 20B so that they take opening and closing actions, and is composed of a pair of upper and lower cam followers 25a, 25b, a cam 26 and a motor 27.

The pair of upper and lower cam followers 25a, 25b are fitted through rods 24a, 24b, respectively, and the cam 26 is interposed between these cam followers 25a, 25b.

This cam 26 has a large-diameter section for adjusting he separation between the cam followers 25a, 25b to cause the hand members 20A, 20B to assume the open condition against the biasing forces of the springs 23 and further has a small-diameter section for adjusting the separation therebetween to allow the hand members 20A, 20B to take the closed condition in accordance with the biasing forces of the springs 23.

Furthermore, the motor 27 rotationally drives the cam 26 so that either the large-diameter section or the small-diameter section formed on the cam 26 is put between the cam followers 25a, 25b.

Moreover, in this embodiment, the hand members 20A, 20B are guided independently (as separate bodies) by the pair of left and right direct-acting bearings 21A, 21B, and when the hand members 20A, 20B are in the closing condition (in a state where the small-diameter section of the cam 26 is located between the cam followers 25a, 25b), fitting portions 20a, 20b of the hand members 20A, 20B to the direct-acting bearings 21A, 21B are formed not to interfere with each other.

More specifically, on the rear end sides of the hand members 20A, 20B, the fitting portions 20a, 20b to which the blocks 21a-2, 21b-2 are attached respectively are made to extend within vertical planes, and these fitting portions 20a, 20b are alternately engaged in a state where the hand members 20A, 20B are in the closed condition.

In the accessor 7 having the hand mechanism 7d thus constructed, when the large-diameter section of the cam 26 is placed between the cam followers 25a, 25b by the motor 27, the cam 26 enlarges the separation between the cam followers 25a, 25b to open the hand members 20A, 20B. In the case of gripping the cartridge by the hand mechanism 7d, after the cartridge is put in between the hand members 20A, 20B being in the open condition, the cam 26 is rotated by the motor 27 so that the small-diameter section of the cam 26 is placed between the cam followers 25a, 25b. Whereupon, the hand members 20A, 20B receive the biasing forces of the springs 23 to come into contact with the cartridge from the above and below, thereby gripping the cartridge.

At this time, in the hand mechanism 7d according to this embodiment, the pair of left and right direct-acting bearings 21A, 21B independently guide the hand members 20A, 20B, respectively, with the result that the sliding resistance does not increase even if the parallelism and flatness of the fitting surfaces of the guide rails 21a-1, 21b-1 constituting the direct-acting bearings 21A, 21B are not set with a high precision.

In addition, now that the fitting portions 20a, 20b of the hand members 20A, 20B do not interfere with each other when the hand members 20A, 20B are in the closed condition, the thickness of the hand mechanism 7d is reducible. That is, in this embodiment, the blocks 21a-2, 21b-2 are disposed to be adjacent to each other at an approximately equal height when the hand members 20A, 20B are in the closed condition.

Accordingly, as compared with the FIG. 8 prior hand mechanism in which its thickness is determined as being the lengths of the two vertically disposed blocks 112a, 112b plus the moving quantity (opening width range) of the hand members 100a, 100b, in this embodiment shown in FIGS. 1 and 4, the thickness of the hand mechanism 7d is determined as being the length of one block 21a-2 or 21b-2 plus the moving quantity (opening width range) of the hand members 20A, 20B. That is, the hand mechanism 7d can be thinned by a quantity corresponding to one block constituting the direct-acting bearing 21A or 21B.

As described above, in the accessor 7 according to the first embodiment of this invention, the two direct-acting bearings 21A, 21B divided are used to vertically guide the pair of upper and lower hand members 20A, 20B, and the fitting portions 20a, 20b to the direct-acting bearings 21A, 21B are made not to interfere with each other when the hand members 20A, 20B are in the closed condition, and therefore, the thickness of the hand mechanism 7d is reducible, and further the sliding resistance does not occur due to the positional shifting (difference in the parallelism or flatness) between the direct-acting bearings 21A, 21B, for that the two direct-acting bearings 21A, 21B used are in the independent relation to each other. Thus, the size and thickness reduction of the hand mechanism 7d are possible without deteriorating the operating performances of the hand members 20A, 20B, which finally contributes to the size reduction and lower manufacturing cost of the library apparatus 1.

[4] Description of Second Embodiment

Figure 5:
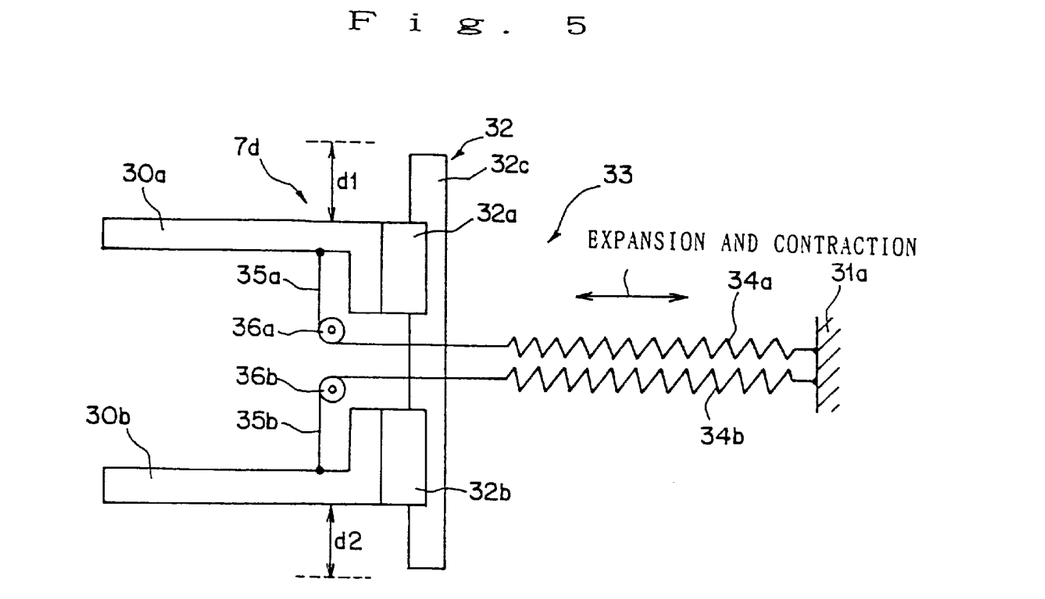
FIG. 5 is a side elevational view illustratively showing a hand mechanism of a cartridge transferring robot (accessor) for a library apparatus according to a second embodiment of this invention.

Secondly, referring to FIGS. 5 and 6, a description will be taken hereinbelow of a hand mechanism 7d of a cartridge transferring robot (accessor 7) for a library apparatus according to a second embodiment of this invention. FIG. 5 is a side elevational view illustratively showing the hand mechanism 7d, and FIG. 6 is a partially broken perspective view illustratively showing a principal portion of the same hand mechanism 7d.

Figure 6:
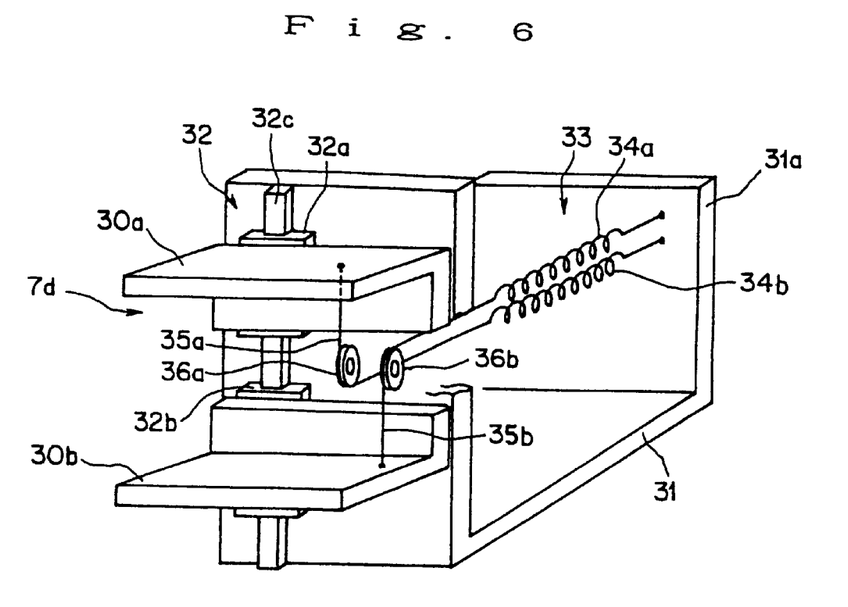
FIG. 6 is a partially broken perspective view illustratively showing a principal portion of the hand mechanism according to the second embodiment.

As shown in FIGS. 5 and 6, the hand mechanism 7d of the accessor 7 according to the second embodiment is made up of a pair of upper and lower hand members 30a, 30b, a hand base 31, a direct-acting bearing 32, a biasing mechanism 33, and an opening and closing mechanism (not shown).

The pair of upper and lower hand members 30a, 30b are respectively made to come into contact with a cartridge (not shown) from the above and below to grip the cartridge, and it substantially has the same structure as those of the prior art shown in FIGS. 7 to 9.

The direct-acting bearing 32 is for fitting the pair of upper and lower hand members 30a, 30b to the hand base 31 so that they are slidable vertically, as in the case of the prior structure shown in FIGS. 7 and 8. The direct-acting bearing 32 is composed of one guide rail 32c fixed to the hand base 31 side, and two blocks (bearings) 32a, 32b made to slide in a state of being guided vertically along the guide rail 32c. The hand members 30a, 30b are fitted to the blocks 32a, 32b, respectively.

The biasing mechanism 33 is for biasing the hand members 30a, 30b in closing directions of gripping the cartridge, and is composed of a first spring 34a, a second spring 34b, wires 35a, 35b and pulleys 36a, 36b.

The first spring 34a is located between the upper hand member 30a and the hand base 31 to downwardly bias the upper hand member 30a, while the second spring 34b is situated between the lower hand member 30b and the hand base 31 to upwardly bias the lower hand member 30b.

These springs 34a, 34b are both placed to horizontally extend backwardly (on the right-hand side in FIG. 5) with respect to the hand members 30a, 30b, and their end portions are connected to a rear end setting section 31a of the hand base 31, whereas their front end portions are connected through the wires 35a, 35b to a lower surface of the hand member 30a and an upper surface of the hand member 30b, respectively.

The wires 35a, 35b are guided by the pulleys 36a, 36b to turn from the vertical direction to the horizontal direction, before making the connections between the hand members 30a, 30b and the springs 34a, 34b, respectively.

Although in the illustration of FIG. 5 the pulleys 36a, 36b are positioned at different heights, in fact, as shown in FIG. 6, the pulleys 36a, 36b are coaxially disposed at the substantially same height.

Furthermore, the opening and closing mechanism in this embodiment is omitted from the illustration, but having the substantially same structure as that of the opening and closing mechanism 22 in the first embodiment described above with reference to FIGS. 1 and 4.

As mentioned above, in the hand mechanism 7d of the accessor 7 according to this embodiment, the first and second springs 34a, 34b constituting the biasing mechanism 33 and producing the forces (cartridge gripping force) for drawing the upper and lower hand members 30a, 30b are located in a surplus space on the rear side (the exterior of the hand members 30a, 30b) with respect to the hand members 30a, 30b. The forces corresponding to the upward and downward moving quantities d1, d2 of the hand members 30a, 30b are obtained with the expansion and contraction of the first and second springs 34a, 34b.

Thus, in this embodiment, the biasing mechanism, which has been placed within the hand members (between the hand members), is located in the external space (surplus space) on the rear side from the space between the hand members 30a, 30b, with the result that, as the springs 34a, 34b of the biasing mechanism 33, it is possible to use springs having a long free length.

Accordingly, since a strong gripping force can be applied to the hand members 30a, 30b at a small space, although the areas of the cartridge gripping portions become small, gripping the cartridge is surely achievable, and the size and thickness reduction of the hand mechanism 7d creating a strong gripping force become easily feasible, which contributes to the size reduction and lower manufacturing cost of the library apparatus 1.

[5] Others

It is also appropriate that a hand mechanism 7d of an accessor 7 is constructed with a combination of the above-described structure(the structure on the disposition of the direct-acting bearings 21A, 21B) according to the first embodiment and the structure (the structure on the disposition of the biasing mechanism 33) according to the second embodiment. In this case, the hand mechanism 7d further reducible in size and thickness.

It should be understood that the present invention is not limited to the above-described embodiments, and that it is intended to cover all changes and modifications of the embodiments of the invention herein used for the purpose of the disclosure, which do not constitute departures from the spirit and scope of the invention.

What is claimed is:

1. A cartridge transferring robot for use in a library apparatus which includes a storage rack for storing a number of cartridges each accommodating a storage medium, a cartridge entry/exit station for making entry/exit of the individual cartridges, and a deck for having access to the storage media in the individual cartridges, said robot being operable to transfer a selective one of the cartridges between the storage rack, the cartridge entry/exit station and the deck, and comprising:

a hand mechanism for gripping the one cartridge to insert the one cartridge into and extract the one cartridge from a selected one of the storage rack, the cartridge entry/exit station and the deck; and a moving mechanism for moving said hand mechanism to a selected one of three positions respectively corresponding to the storage rack, the cartridge entry/exit station, and the deck;

said hand mechanism including
   (I) a hand base movably supported by said moving mechanism,
   (II) a pair of parallel vertical guide rails attached to said hand base,
   (III) a pair of linear-moving bearings, each of said pair of linear-moving bearings being vertically slidably mounted on a respective one of said pair of guide rails,
   (IV) upper and lower hand members, each of said hand members being independtly attached to a respective single one of said pair of bearings, for clamping the one cartridge therebetween, and
   (V) an opening and closing mechanism for moving said upper and lower hand members away from each other to an opened posture, and moving said upper and lower hand members toward each other to a closed posture, each of said upper and lower hand members being solely supported by the respective single guide rail with the respective bearing and having a shape so as to be movable without interfering with each other.

2. A library apparatus comprising:

a storage rack for storing a number of cartridges each accommodating a storage medium;

a cartridge entry/exit station for making entry/exit of the individual cartridges;

a deck for carrying out access to the storage media in the individual cartridges; and a cartridge transferring robot for transferring a selective one of the cartridges between said storage rack, said cartridge entry/exit station and said deck, said robot including a hand mechanism for gripping the one cartridge to insert the one cartridge into and remove the one cartridge from a selected one of said storage rack, said cartridge entry/exit station, and said deck, and a moving mechanism for moving said hand mechanism to a selected one of three positions respectively corresponding to said storage rack, said cartridge entry/exit station, and said deck, said hand mechanism including
   (I) a hand base movably supported by said moving mechanism,
   (II) a pair of parallel vertical vertical guide rails attached to said hand base,
   (III) a pair of linear-moving bearings, each of said pair of linear-moving bearings being vertically slidably mounted on a respective one of said pair of guide rails,
   (IV) upper and lower hand members, each of said hand members being independtly attached to a respective single one of said pair of bearings, for clamping the one cartridge therebetween, and
   (V) an opening and closing mechanism for moving said upper and lower hand members away from each other to an opened posture, and moving said upper and lower hand members toward each other to a closed posture, said upper and lower hand members each being solely supported by the respective single guide rail with the respective bearing and having a shape so as to be movable without interfering with each other.

* * * * *

UNITED STATES PATENT AND TRADEMARK OFFICE
CERTIFICATE OF CORRECTION

PATENT NO. : 6,262,862 B1
DATED : July 17, 2001
INVENTOR(S) : Kato et al.

It is certified that error appears in the above-identified patent and that said Letters Patent is hereby corrected as shown below:

<u>Column 11,</u>
Line 51, delete "independtly" and insert -- independently -- therefore.

<u>Column 12,</u>
Line 40, delete "independtly" and insert -- independently -- therefore.

Signed and Sealed this

Seventh Day of May, 2002

Attest:

*Attesting Officer*

JAMES E. ROGAN
*Director of the United States Patent and Trademark Office*